United States Patent
Chen

(10) Patent No.: US 9,039,249 B2
(45) Date of Patent: May 26, 2015

(54) BACKLIGHT MODULE

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 22 days.

(21) Appl. No.: 14/067,977

(22) Filed: Oct. 31, 2013

(65) Prior Publication Data

US 2015/0109818 A1    Apr. 23, 2015

(30) Foreign Application Priority Data

Oct. 21, 2013  (TW) .............................. 102137881 A

(51) Int. Cl.
*F21V 5/00*      (2006.01)
*F21V 8/00*      (2006.01)
*F21K 99/00*     (2010.01)

(52) U.S. Cl.
CPC .. *G02B 6/003* (2013.01); *F21K 9/52* (2013.01)

(58) Field of Classification Search
USPC .............. 362/249.01, 249.02, 259, 296.1, 362/311.12, 331, 335, 551, 553, 558, 608, 362/610, 612, 613, 615, 621, 800; 349/57, 349/61, 65; 385/33
See application file for complete search history.

(56) References Cited

U.S. PATENT DOCUMENTS

| 4,799,754 | A  | * | 1/1989  | Goldenberg ..................... 385/33 |
| 5,349,590 | A  | * | 9/1994  | Amirkhanian et al. ........... 372/6 |
| 5,818,809 | A  | * | 10/1998 | Arai et al. ................ 369/112.24 |
| 6,370,298 | B1 | * | 4/2002  | Koops ............................. 385/33 |
| 8,542,349 | B2 | * | 9/2013  | Laitinen et al. ................. 356/32 |
| 2010/0118283 | A1 | * | 5/2010  | Aizawa et al. ................ 353/100 |
| 2011/0190749 | A1 | * | 8/2011  | McMillan et al. ............. 606/16 |
| 2013/0114076 | A1 | * | 5/2013  | Schleipen et al. ............ 356/246 |
| 2013/0345687 | A1 | * | 12/2013 | McMillan et al. ............. 606/18 |

* cited by examiner

*Primary Examiner* — Hargobind S Sawhney
(74) *Attorney, Agent, or Firm* — Novak Druce Connolly Bove + Quigg LLP

(57) ABSTRACT

A backlight module includes a laser light source, a light guiding board located at a side of the laser light source, a first lens and a second lens both located at a light path of light beams emitted from the laser light source. The laser light source includes one laser diode or a plurality of laser diodes. The light guiding board includes a light incident face and a light emerging face. The first lens firstly converges and then diverges the light beams emitted from the laser light source. The second lens changes the light beams passed through the first lens to be parallel light beams. The parallel light beams have a larger width than that of the light beams just emitted from the laser light source. The parallel light beams enter the light guiding board via the light incident face of the light guiding board.

15 Claims, 3 Drawing Sheets

BACKLIGHT MODULE

BACKGROUND

1. Technical Field

The present disclosure generally relates to backlight modules, and particularly to a backlight module having a laser diode as a light source.

2. Description of Related Art

Laser diode is a light source with high luminous efficiency. Due to emitting single light, small emission angle of light beam, high luminous intensity, small volume, long life and other characters, laser diode is generally used as a light source in a projecting system.

However, due to the small emission angle of light beam, the laser diode only can illuminate a little area. When the laser diodes are used as light source in backlight modules of LCD or TV, some area cannot be illuminated by the laser diodes, it will produce light and dark zones, which results in undesirable LCD or TV products, therefore, the laser diode is restricted to be the light source in the backlight module.

Therefore, what is needed is to provide a backlight module having a laser diode as a light source which can overcome the above shortcomings.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure.

DETAILED DESCRIPTION

Reference will now be made to the drawings to describe the backlight module, in detail.

Figure 1:
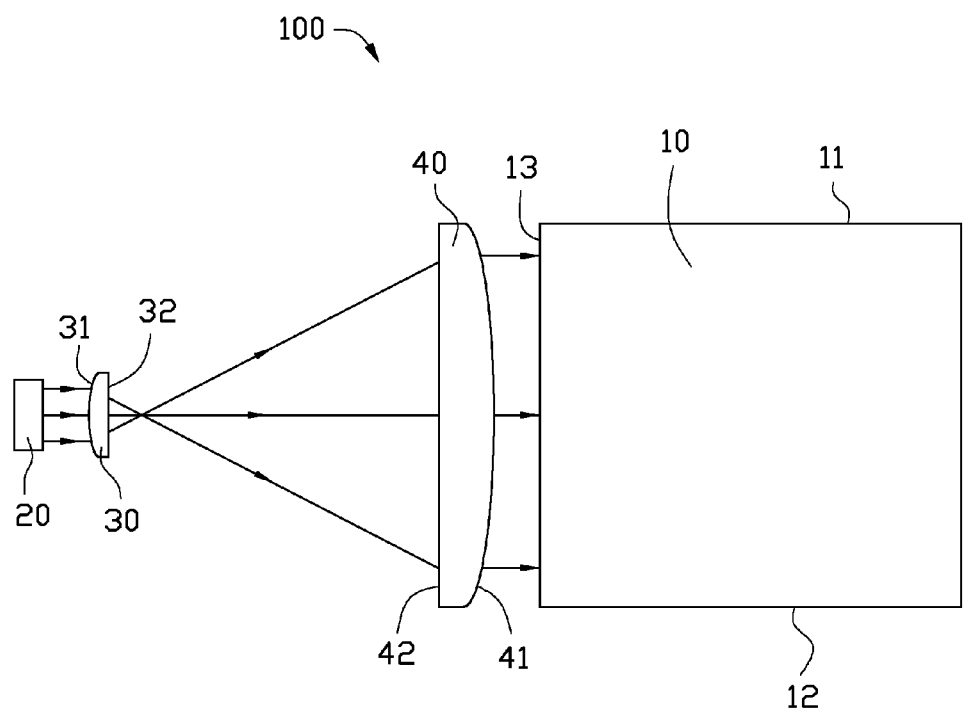
FIG. 1 is a schematic view of a backlight module and light path of the backlight module in accordance with a first embodiment of the present disclosure.

Referring to FIG. 1, a backlight module 100 according to a first embodiment is illustrated. The backlight module 100 includes a light guiding board 10, a laser light source 20 located at a lateral side of the light guiding board 10, a first lens 30 and a second lens 40 located between the light guiding board 10 and the laser light source 20. Light emitted from the laser light source 20 passes through the first lens 30, the second lens 40 and the light guiding board 10 successively. The laser light source 20 includes one laser diode or a plurality of laser diodes emitting red light beam, green light beam and blue light beam.

The light guiding board 10 is a substantially rectangular plate. When light emerges from the light guiding board 10 to the air, the light guiding board 10 has a total internal reflection angle β. The light guiding board 10 includes a first face 11 and a second face 12 opposite to the first face 11, a light incident face 13 connecting the first face 11 and the second face 12. The light incident face 13 faces the second lens 40. The first face 11 and the second face 12 each are a flat face, i.e., each of the first face 11 and the second face 12 is in a plane. The light incident face 13 is a flat face, i.e., the light incident face 13 is in a plane. The first face 11 is perpendicular to the light incident face 13. Light reflecting structures may be formed at the second face 12.

The first lens 30 is a planar-convex cylindrical lens. The first lens 30 includes a first convex cylinder face 31 and a first plane 32 opposite to the first convex cylinder face 31. The first convex cylinder face 31 right faces the laser light source 20. The first plane 32 faces the second lens 40. The light path of the light emitted from the laser light source 20 is changed by the first lens 30 when the light passes through the first lens 30, in details, after light beams from the laser light source 20 enter the first lens 30 via the first convex cylinder face 31 and emerge out the first lens 30 via the first plane 32, the light beams are firstly converged, then diverged and illuminate the second lens 40. A converged point, i.e., the focal point, of the light beams is located between the first lens 30 and the second lens 40.

The second lens 40 is a planar-convex cylindrical lens. The second lens 40 is larger than the first lens 30 in size. The second lens 40 includes a second convex cylinder face 41 and a second plane 42 opposite to the second convex cylinder face 41. The second convex cylinder face 41 right faces the light incident face 13 of the light guiding board 10. The second plane 42 right faces the first plane 32 of the first lens 30. The light path of the light emitted from the laser light source 20 is further changed by the second lens 40 when the light passes through the first lens 30 and the second lens 40, in details, after the light beams diverged by the first lens 30 enter the second lens 30 via the second plane 42 and emerge out the second lens 40 via the second convex cylinder face 41, the light beams are changed to be parallel light beams and illuminate the light incident face 13 of the light guiding board 10.

It can be understood that, according to actual requirement, the first lens 30, the second lens 40 can be adjusted in sizes and distances therebetween, distances between the laser light source 20 and the first lens 30 can be adjusted, and distances between the second lens 40 and the light guiding board 10 can also be adjusted, so long as the light emitted from the laser light source 20 can satisfy the actual requirement after the light passes through the first lens 30 and the second lens 40.

Figure 2:
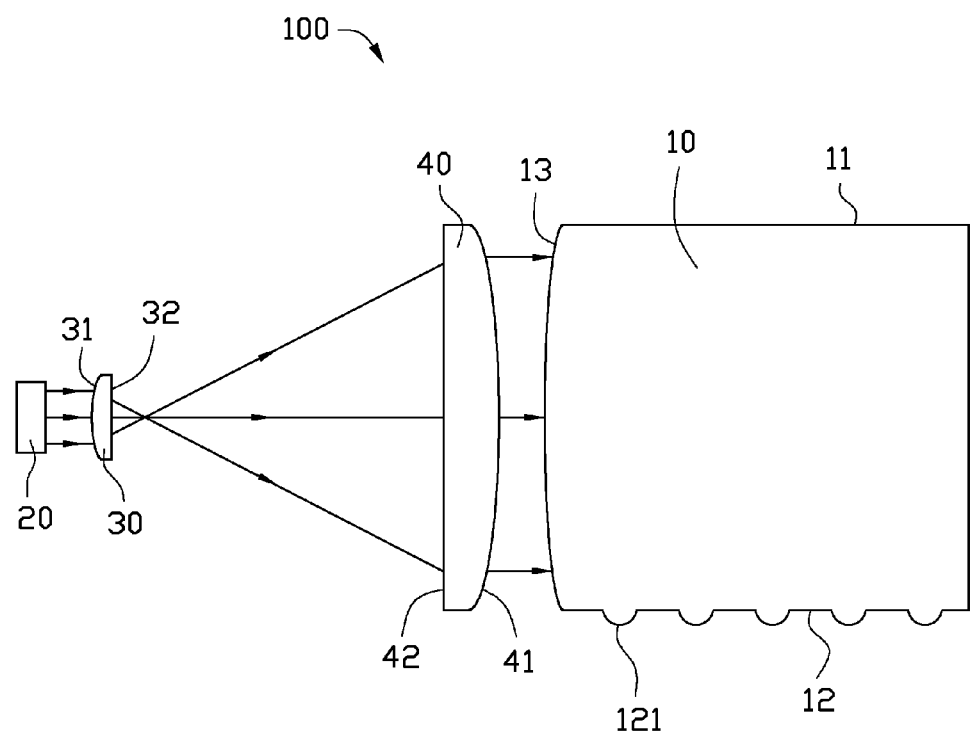
FIG. 2 is a schematic view of a backlight module and light path of the backlight module in accordance with a second embodiment of the present disclosure.

Please referring to FIG. 2, a backlight module 100 according to a second embodiment is illustrated. The backlight module 100 of the second embodiment has structures similar to that of the backlight module 100 of the first embodiment, differences between the second embodiment and the first embodiment are that, the light incident face 13 of the light guiding board 10 of the second embodiment is a convex face facing the second lens 40, the second face 12 forms a plurality of projecting ribs 121 projecting outwardly. The projecting ribs 121 are spaced from each other at a certain interval and parallel to each other. In this embodiment, each of the projecting ribs 121 has an arched cross section, it can be understood that, each of the projecting ribs 121 can have other cross sections.

According to the first and second embodiments, when the backlight module 100 works, the light beams emitting from the laser light source 20 are converged firstly and then diverged by the first lens 30, the light beams passed through the first lens 30 reach the second lens 40 and are changed to be parallel light beams by the second lens 40, at this time, the light beams passed through the first lens 30 and the second lens 40 are broaden in width relatively to a width of the light beams just emitted from the laser light source 20, therefore, almost or whole of the light incident face 13 of the light guiding board is illuminated by the light beams passed through the first lens 30 and the second lens 40. The light beams entering the light guiding board 10 via the light incident face 13 are refracted at the light incident face 13. In the light guiding board 10, the first face 11 is a light emerging face, the second face 12 is a light reflecting face. If the light beams reach the first face 11 with an incident angle less than the total internal reflection angle β of the light guiding board 10, the light beams emerge out via the first face 11, if the light beams reach the first face 11 with an incident angle equal or larger than the total internal reflection angle β of the light guiding board 10, the light beams are totally reflected by the first face 11. The light beams reflected by the first face 11 reach other faces such as the second face 12 of the light guiding board 10 and are reflected by other faces such as the second face 12, or further reflected by the first face 11, until the light beams reach the first face 11 with an incident angle less than the total internal reflection angle β of the light guiding board 10 and emerge out via the first face 11. Therefore, almost of the light beams emerge out of the light guiding board 10 via the first face 11 and the outing light is uniform. Especially, when the light beams reach the second face 12, incident angles of the light beams are further changed and width of the light beams are further broaden due to the projecting ribs 121 at the second face 12.

Figure 3:
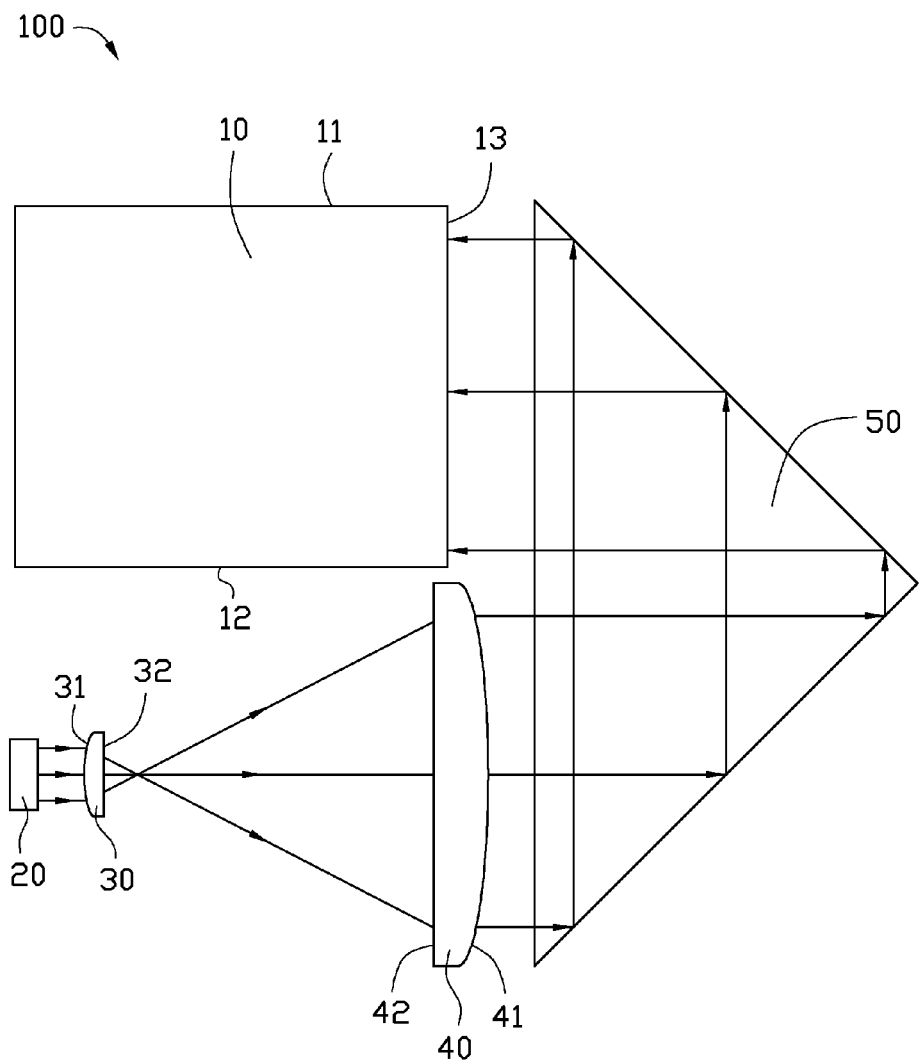
FIG. 3 is a schematic view of a backlight module and light path of the backlight module in accordance with a third embodiment of the present disclosure.

Please referring to FIG. 3, a backlight module 100 according to a third embodiment is illustrated. The backlight module 100 of the third embodiment has structures similar to that of the backlight module 100 of the first embodiment, differences between the third embodiment and the first embodiment are that, the backlight module 100 of the third embodiment further includes deflecting prism 50, the side face 12 of the light guiding board 10 faces the first lens 30 and the second lens 40, the light incident face 13 of the light guiding board 10 faces the deflecting prism 50. The deflecting prism 50 includes a light incident face facing the second lens 40 and a light exiting face facing the light incident face 13 of the light guiding board 10. The light beams passed through the first lens 30 and the second lens 40 reach the light incident face of the deflecting prism 50 and are reflected to the light exiting face of the deflecting prism 50, then the light beams are reflected by the light exiting face to the light incident face 13 of the light guiding broad 10.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A backlight module, comprising:
a laser light source comprising one laser diode or a plurality of laser diodes;
a light guiding board located at a side of the laser light source, the light guiding board comprising a light incident face and a light emerging face; and
a first lens and a second lens both located at a light path of light beams emitted from the laser light source, the first lens firstly converging and then diverging the light beams emitted from the laser light source, the second lens changing the light beams passed through the first lens to be parallel light beams, the parallel light beams having a larger width than that of the light beams just emitted from the laser light source, the parallel light beams entering the light guiding board via the light incident face of the light guiding board.

2. The backlight module of claim 1, wherein the first lens is a planar-convex cylindrical lens.

3. The backlight module of claim 2, wherein the first lens comprises a first convex cylinder face and a first plane opposite to the first convex cylinder face, the first convex cylinder face facing the laser light source, the first plane facing the second lens.

4. The backlight module of claim 1, wherein the second lens is a planar-convex cylindrical lens.

5. The backlight module of claim 4, wherein the second lens comprises a second convex cylinder face and a second plane opposite to the second convex cylinder face, the second plane facing the first lens.

6. The backlight module of claim 5, wherein the second convex cylinder face of the second lens faces the light incident face of the light guiding board.

7. The backlight module of claim 6, wherein the first lens and the second lens are located between the laser light source and the light incident face of the light guiding board.

8. The backlight module of claim 5 further comprising a light deflecting prism, wherein deflecting prism comprises a light incident face and a light exiting face, the second convex cylinder face of the second lens facing the light incident face of the light deflecting prism, the light exiting face of the light deflecting prism facing the light incident face of the light guiding board.

9. The backlight module of claim 1, wherein the light incident face of the light guiding board is perpendicular to the light emerging face of the light guiding board.

10. The backlight module of claim 1, wherein the light guiding board further comprises a light reflecting face opposite to the light incident face of the light guiding board.

11. The backlight module of claim 10, wherein the light reflecting face of the light guiding board forms a plurality of projecting ribs projecting outwardly.

12. The backlight module of claim 11, wherein the projecting ribs are spaced from each other.

13. The backlight module of claim 11, wherein each of the projecting ribs has an arced cross section.

14. The backlight module of claim 1, wherein the laser light source emits red light beams, green light beams and blue light beams.

15. The backlight module of claim 1, wherein the second lens is larger than the first lens in size.

\* \* \* \* \*